Sept. 20, 1971 W. G. BALLENGER 3,605,955
BRAKING ASSEMBLY FOR STROLLERS AND THE LIKE
Filed Jan. 5, 1970 2 Sheets-Sheet 1
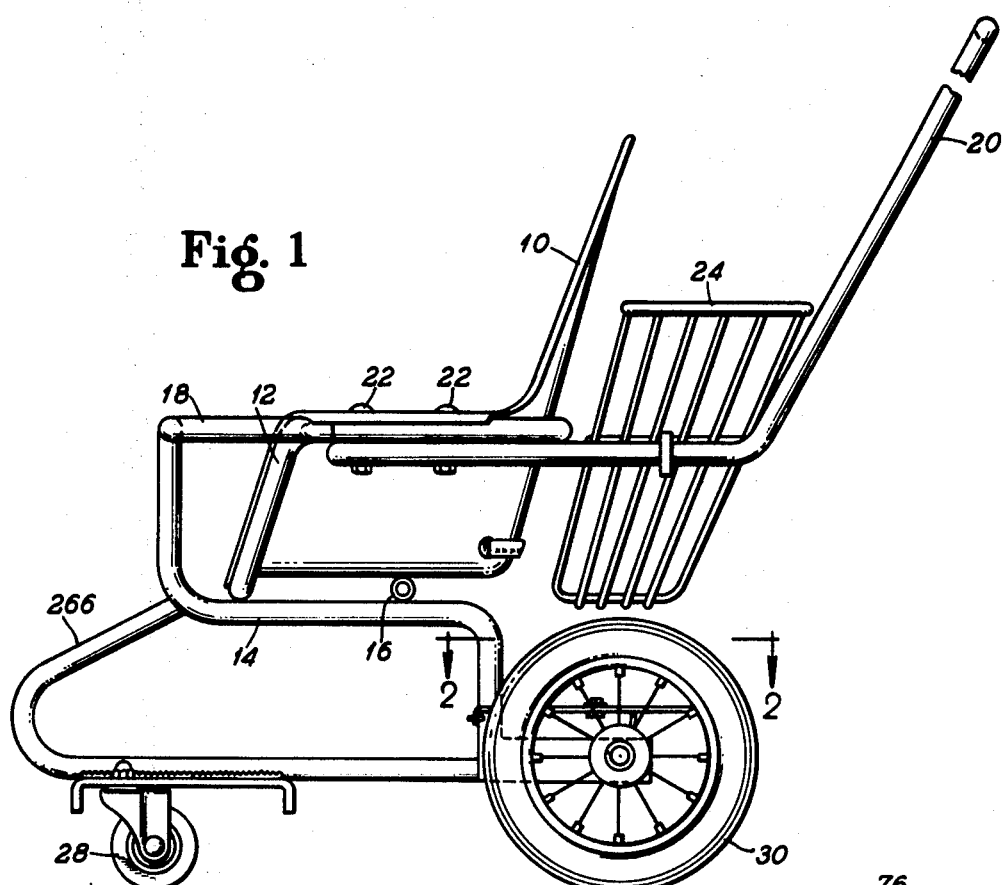
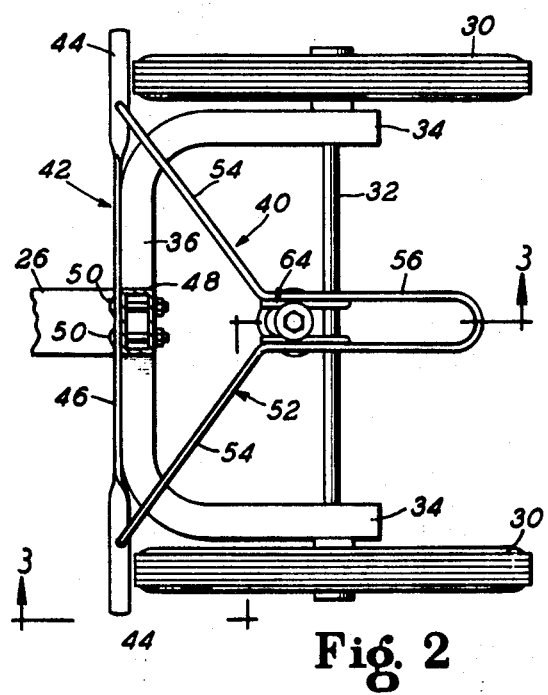
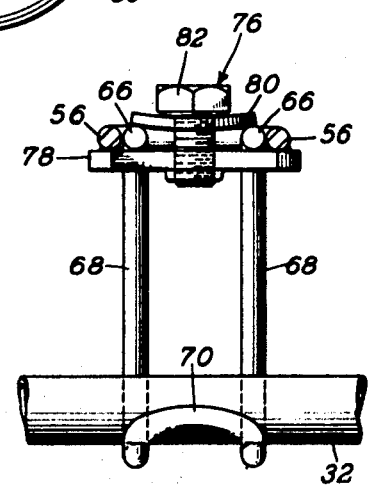
INVENTOR.
William G. Ballenger
BY
Dominik, Knechtel & Godula
ATTYS.

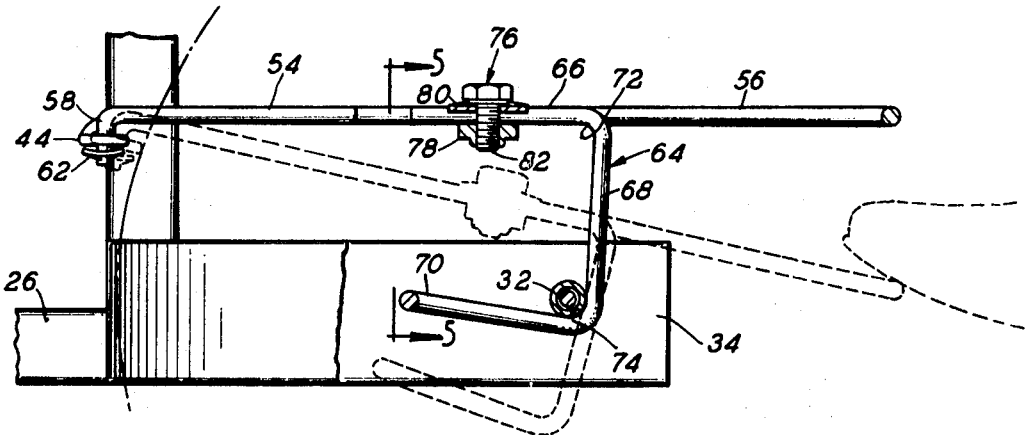
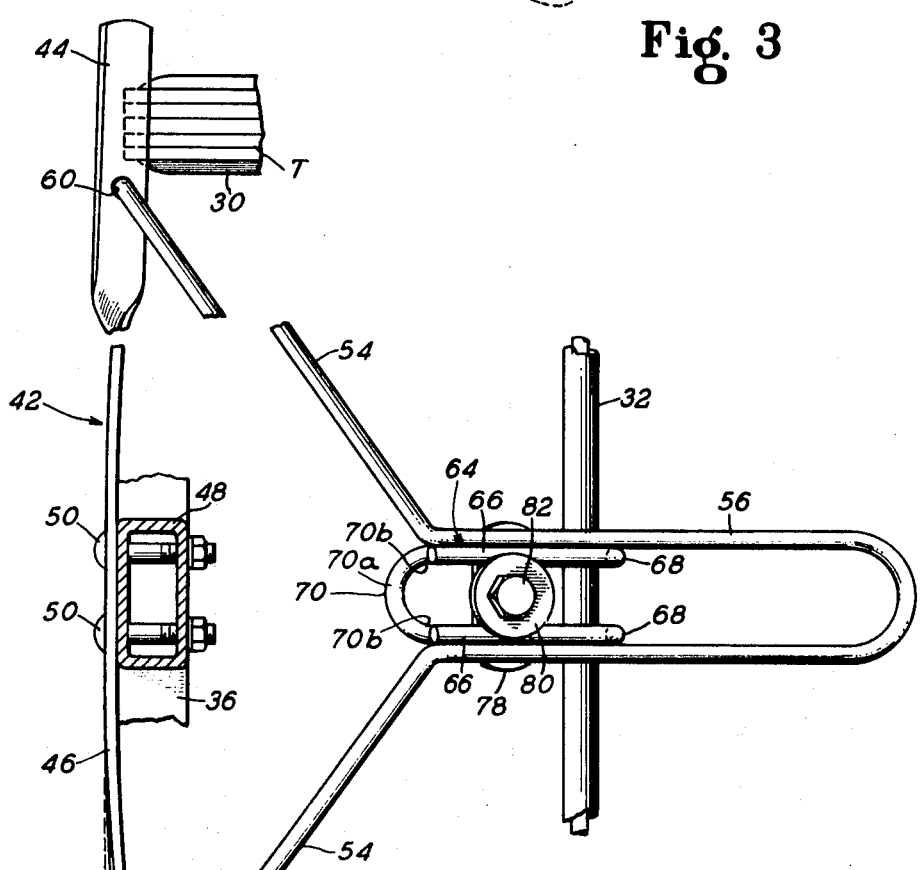
Fig. 3
Fig. 4
INVENTOR.
William G. Ballenger
BY
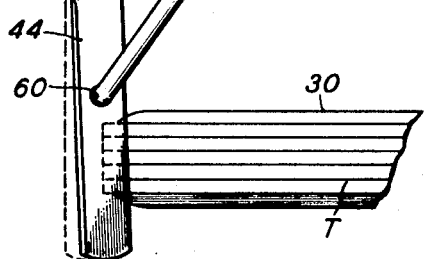
ATTYS.

United States Patent Office 3,605,955
Patented Sept. 20, 1971

3,605,955
BRAKING ASSEMBLY FOR STROLLERS
AND THE LIKE
William G. Ballenger, Highland Park, Ill., assignor to
Central Specialties Co., Chicago, Ill.
Filed Jan. 5, 1970, Ser. No. 693
Int. Cl. B62b 9/08
U.S. Cl. 188—20
8 Claims

ABSTRACT OF THE DISCLOSURE

A braking assembly in which a wheel contacting member is engaged and disengaged by movement of a locking member in contact with a transverse stationary member. The member is flexible and has a yoke member attached at the ends thereof, the center portion of the yoke member forming a loop extension to which manual braking force is applied. The locking member is adjustably attached to the loop extension.

---

This invention relates to a braking assembly which is particularly useful for infant strollers, or the like, wherein an elongated braking member is moved into and out of tight frictional engagement with the tread of the wheels.

Strollers, buggies or the like are provided with braking assemblies which generally have an abutting member moveable into tight frictional engagement with the tread surface of a wheel to thereby prevent rotation of said wheel. A braking assembly of such type is required on infant perambulators, but it will be recognized that similar types of braking assemblies are or may be mounted on other, smaller carts, such as shopping carts. Such abutting frictional braking members are usually kick operated, and it is required that they be quickly engaged and disengaged by a kick action of the foot. Many such braking assemblies provide only a single member for one wheel engagement, but it is understandable that braking action will be more reliable and certain with a braking member that simultaneously engages an aligned pair of wheels, preferably the rear wheels of a four wheel cart.

A disadvantage of braking assemblies of the foregoing type is the loss of braking action through wear of the elastomeric tread on the wheels. Such braking assemblies are designed for a given displacement in moving the elongated braking member into abutting engagement with the wheel tread. This limited displacement does not accommodate to wear of the wheel, thereby resulting in reduced frictional engagement of the elongated member with the wheel. For practical purposes, the braking action is entirely lost when wear progresses to a sufficient degree.

It is an object of the present invention to provide a braking assembly for infant strollers or the like in which an element of the braking assembly may be adjusted for wear of the wheel tread to retain good braking action. It is particularly an aspect of this object to provide an improved means for adjusting the displacement of the wheel engaging element of the braking assembly so that desired frictional engagement of the braking element with the wheel tread is maintained.

Another important object is a braking assembly of the type described wherein the brake may be engaged and disengaged by quick and easy kicking action, while still providing such assembly with improved features of adjustability.

Yet another object is a braking assembly of the type described wherein both wheels of an aligned pair are engaged by a braking element which accommodates on wear of the tread surfaces.

Still another important object is a braking assembly of the type described, wherein an adjustable member of improved features is mounted in an improved manner to other elements of the braking assembly to attain stability, rigidity, and serviceability over extended periods.

The foregoing objects are attained together with still other objects which will occur to practitioners from time to time by considering the invention presented in the following disclosure, including drawings wherein:

FIG. 1 is a side elevational view of a representative stroller on which the braking assembly of the invention is mounted;

FIG. 2 is a top plan view along 2—2 of FIG. 1, with parts removed for purposes of clarity;

FIG. 3 is a view along a line 3—3 of FIG. 2, on an enlarged scale, and partly in section;

FIG. 4 is a view similar to FIG. 2, but on an enlarged scale, and illustrating the assembly in brake engaging position; and FIG. 5 is a portional view along line 5—5 of FIG. 3, on a slightly enlarged scale, and with parts in section.

In the following description, use of the same numerals will refer to the same structures, elements, or parts, as the case may be.

Referring first to the view of FIG. 1, there is shown an infant stroller of the type in which the braking assembly of the present invention finds useful application. The illustrated stroller has a unitary seat structure 10 positioned in an angular seat support 12 which is supported at its lowermost portion on an upper frame 14. A transverse supporting member 16 also supports the seat on the upper frame 14. A grasping portion 18 is shown secured to the angular support, and a push bar 20 is likewise shown fastened to the angular support by bolt and nut assemblies 22 which pass through apertures in the unitary seat support. The infant stroller is shown additionally with a basket 24 mounted between the push bar, a lower frame portion 26, a front caster 28, and a pair of aligned rear wheels 30. The rear wheels 30 are shown rotatably mounted on a shaft 32 which passes through openings in spaced arms 34 of rear frame portion 36.

The improved brake assembly of this invention is shown generally at 40. It includes a cross bar 42 which is shown in the form of an elongated flat plate with opposite ends 44 twisted about 90° so that the planar surfaces of such ends are substantially normal to the planar surface of an intermediate portion. The intermediate portion is shown mounted to downward branch 48 of upper frame part 14. Bolt and nut assemblies 50 pass through apertures in the intermediate portion and the downward branch 48 (not shown) to secure the cross bar to the frame part of the stroller. The cross bar 42 is flexible so that the opposite flat ends may be displaced forwardly and rearwardly when such cross bar is mounted to a frame part of the infant stroller.

The brake assembly also includes a yoke member shown generally as 52. The yoke member has spaced outwardly flaring arms, 54, and an intermediate loop extension 56. The yoke member is, therefore, illustrated to be an elongated member with an intermediate bent loop portion and outwardly flaring arms, the ends of which are downturned at 58 to pass through slightly oversized apertures 60 in the flat ends of the cross bar. The oversized apertures allow more "play" to accommodate displacement of the downturned ends when moving the cross bar into and out of braking engagement. The downturned ends are retained in the apertures by locking washers, one of which is shown at 62.

The flexible cross bar is moved inwardly and outwardly by the yoke member when a locking member, shown generally as 64, is moved to different positions on the shaft or stationary member 32 of the frame support. The locking member has a generally U-shaped configuration, formed by a prebent elongated member. The locking member has an upper horizontal portion formed by laterally spaced legs 66, a downward extending portion formed by spaced legs 68, and a lower horizontal portion extending towards the cross bars, said lower horizontal portion formed by a closed loop 70. The closed loop includes an arcuate connecting portion 70a joining lower spaced legs 70b. The junction 72 between the upper horizontal portion and the downwardly spaced legs represents a first position which engages the stationary member 32 to lock the brake; and the junction 74 between the bottom horizontal portion and the downwardly spaced legs represents a second position for engaging the stationary member 32 for releasing the brake.

The locking member is slidably and adjustably positioned in the loop extension 56 by a weld nut assembly 76. This assembly includes a lower plate 78 which is preferably fixed in abutting relationship against the undersides of the laterally spaced legs 76 and the legs of the loop extension 56. It also includes a washer 80 in abutting relationship against the top side of the laterally spaced legs 66. A bolt 82 passes through aligned threaded passageways in the plate 78 and washer 80. Preferably, the weld nut assembly is tightened so that washer 80 assumes a concave-convex configuration as shown particularly in FIG. 5. The tightening of the weld nut therefore secures the locking member more tightly to the yoke member because it tends to spread the legs 66 of the locking member and the adjoining legs of the loop extension 56.

In operation, the brake assembly may be mounted to an infant stroller, for example, the type disclosed and claimed in U.S. Ser. No. 760,424, filed Sept. 18, 1968, in the name of the present applicant. The flexible bar is moved into braking position by kicking extension 56 downwardly in a plane parallel to the radial axes of the wheels, as indicated in phantom in FIG. 3. This action will release junction 74 at one position with the stationary member, and move junction 72 into a second position into engagement with said stationary member. The arc traced by the downwardly moving yoke member will flex the opposite flat ends 44 of the cross bar into tight frictional engagement with the tread surface T of the wheels 30. The brake is released by kicking loop extension upwardly, and moving locking member from the position of engagement with junction 72 to the position of engagement with junction 74. This brake release position is indicated by solid lines in the view of FIG. 3.

When the tread surface T wears down, the brake engaging edge of the flat ends 44 of the cross bar will not attain the previous tight frictional engagement. This will cause brake slippage or complete brake failure. The brake assembly may be quickly accommodated to such wear by loosening weld nut assembly 76, and moving locking member 64 by moving upper horizontal portion towards the loop extension in a plane which is parallel to the radial axes of the wheels. The sliding action of the member continues in a plane parallel to the radial axes of the wheels until the cross bar is sufficiently displaced to attain desired frictional engagement with the tread surfaces of the wheels. The weld nut assembly is then secured to hold the locking member in the new position in the yoke member.

There now follow the claims of this invention.

What is claimed is:

1. A braking assembly for aligned wheels having elastomeric tread surfaces, said wheels rotatably mounted to a frame of an infant stroller or the like, including
    a flexible cross bar having opposed ends positioned adjacent the tread surface of the wheels, an intermediate portion of said cross bar being mounted to said frame,
    a yoke member joined at one end to opposed end portions of said cross bar, the other end of said yoke member extending between the aligned wheels and being movable in a plane parallel to the radial axes of said wheels,
    a transverse stationary member mounted to said frame, and
    a locking member adjustably mounted to said yoke member, said locking member having a downwardly extending portion which contacts said stationary member in a first position to move said yoke and cross bar out of braking engagement, and which downwardly extending portion contacts said stationary member in a secondary position to move said yoke member and cross bar into braking position, said locking member being adjustably movable in a plane parallel to the radial axes of said wheels.

2. A braking assembly which includes the features of claim 1 above, wherein said yoke member is an elongated rigid member having flaring arms, the free ends of which are mounted to the opposed portions of said cross bar, and said elongated member having an intermediate, elongated loop extension formed by spaced legs of said elongated member, said locking members being slidably mounted within the spaced legs of said loop.

3. A braking assembly which includes the features of claim 2 above, wherein the free ends of said flaring arms are engaged in oversize apertures in the opposed portions of the cross bar to accommodate slight displacement when moving the cross bar into and out of braking position.

4. A braking assembly which includes the features of claim 2 above, wherein said locking member is an elongated member having an upper horizontal portion in a plane common with the plane of the loop portion, and downwardly extending portion in a plane normal to the plane of the loop portion, and a lower horizontal loop portion extending towards said cross bar.

5. A braking assembly which includes the features of claim 4 above, wherein said locking member is adjustably secured between the spaced legs of said loop portion by a weld nut assembly, including a plate positioned below and fixed to the spaced legs of the loop member and to laterally spaced legs of the upper horizontal portion, and a washer spanning said laterally spaced legs of the upper horizontal portion, and a bolt securing the washer to the plate so that said washer assumes a concave-convex configuration to thereby secure the position of the locking member on said yoke member.

6. A braking assembly to be used for braking an aligned pair of wheels by frictionally engaging the tread surfaces of both wheels, including
    a flexible cross bar having opposed ends formed as flat surfaces, said flat surfaces having braking edges for frictionally engaging said tread surfaces,
    a yoke member having spaced arms and an intermediate extension, the ends of said arms joined to said cross bar at opposite portions thereof,
    a locking member slidably mounted to said extension, said locking member including an upper horizontal portion slidable along said extension, a downwardly extending portion, and a lower horizontal portion extending toward the cross bar,
    a locking means to fix said locking member along said extension at a selected position, and
    mounting means on said cross bar intermediate the opposite ends thereof.

7. A braking assembly which includes the features of claim 6 above wherein the ends of the arms of said yoke member are positioned in oversized apertures in the flat surfaces of the opposite ends of the cross bars, and wherein said cross bar is an elongated plate with opposite end portions turned about 90° relative to the intermediate portion so that said opposite end portions present a planar surface substantially normal to the planar surface of the intermediate portion.

8. A braking assembly which includes the features of claim 6 above, wherein said yoke member is an elongated member, the spaced arms of said elongated member flaring outwardly, and said intermediate extension being a closed bent loop, said locking member being an elongated member in which the upper horizontal portion is formed from laterally spaced legs, the downwardly extending portion is formed from downwardly spaced legs, and the horizontal portion extending towards the cross bar is formed by a closed loop, and said locking means include a weld nut assembly having a bottom plate fixed against the undersides of the legs of said loop member and locking member, an upper washer in abutting relationship against the laterally spaced legs of said locking member, and a bolt securing said washer and plate so that said washer assumes a concave-convex configuration urging said laterally spaced legs of the locking member against the spaced legs of the loop portion.

References Cited

UNITED STATES PATENTS

| | | | |
|---|---|---|---|
| 2,249,860 | 7/1941 | Sheldrick | 188—20 |
| 2,456,250 | 12/1948 | Boudreau | 188—20X |
| 2,474,804 | 6/1949 | Schwarzbaum | 188—20 |
| 2,873,820 | 2/1959 | Rizzuto | 188—20 |

DUANE A. REGER, Primary Examiner